United States Patent
Kothiwale et al.

(10) Patent No.: US 11,360,542 B2
(45) Date of Patent: Jun. 14, 2022

(54) METHOD AND APPARATUS FOR OPERATING A PROCESSOR IN AN ELECTRONIC DEVICE

(71) Applicant: Samsung Electronics Co., Ltd., Suwon-si (KR)

(72) Inventors: Mahantesh Kothiwale, Bangalore (IN); Satyam Namdeo, Bangalore (IN); Yunas Rashid, Bangalore (IN); Srinivasa Rao Kola, Bangalore (IN); Manjunath Jayram, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 16/771,976

(22) PCT Filed: Dec. 12, 2018

(86) PCT No.: PCT/KR2018/015774
§ 371 (c)(1),
(2) Date: Jun. 11, 2020

(87) PCT Pub. No.: WO2019/117623
PCT Pub. Date: Jun. 20, 2019

(65) Prior Publication Data
US 2021/0072814 A1   Mar. 11, 2021

(30) Foreign Application Priority Data

Dec. 12, 2017 (IN) .............................. 201741044617
Oct. 17, 2018 (IN) ............................ 2017 41044617

(51) Int. Cl.
G06F 1/3234 (2019.01)
G06F 1/324 (2019.01)
H04W 52/02 (2009.01)

(52) U.S. Cl.
CPC ............ *G06F 1/3243* (2013.01); *G06F 1/324* (2013.01); *H04W 52/029* (2013.01)

(58) Field of Classification Search
CPC ..... G06F 1/3243; G06F 1/324; H04W 52/029
See application file for complete search history.

(56) References Cited

U.S. PATENT DOCUMENTS

| 8,327,158 B2 | 12/2012 | Titiano et al. |
| 2008/0307240 A1 | 12/2008 | Dahan et al. |

(Continued)

FOREIGN PATENT DOCUMENTS

| JP | 2008211696 A | 9/2008 |
| JP | 2014-116840 A | 6/2014 |
| KR | 10-2014-0125146 A | 10/2014 |

OTHER PUBLICATIONS

Indian Office Action dated Jan. 21, 2021, issued in Indian Application No. 201741044617.

(Continued)

*Primary Examiner* — Jaweed A Abbaszadeh
*Assistant Examiner* — Hyun Soo Kim
(74) *Attorney, Agent, or Firm* — Jefferson IP Law, LLP

(57) ABSTRACT

This disclosure provides a method and an apparatus for operating a processor in an electronic device. The method includes identifying an average throughput for a first set of subframes, predicting a load of the processor for a second set of subframes based on the identified average throughput, determining an operating frequency of the processor for the second set of subframes based on the predicted load, and operating the processor on the determined operating frequency for the second set of subframes.

12 Claims, 10 Drawing Sheets

(56) References Cited

U.S. PATENT DOCUMENTS

| | | | |
|---|---|---|---|
| 2009/0059857 A1 | 3/2009 | Kim et al. | |
| 2011/0201367 A1 | 8/2011 | Aminaka et al. | |
| 2014/0153497 A1 | 6/2014 | Brisebois et al. | |
| 2014/0301259 A1 | 10/2014 | Homchaudhuri et al. | |
| 2016/0165169 A1* | 6/2016 | Kim .................. | H04L 1/0083 348/724 |
| 2016/0342191 A1* | 11/2016 | On ..................... | G06F 1/324 |
| 2017/0031430 A1 | 2/2017 | Ansorregui et al. | |
| 2018/0284864 A1* | 10/2018 | HomChaudhuri ...... | G06F 1/324 |

OTHER PUBLICATIONS

Antonio Barbalace, Quantitative Evaluation of Single and Multicore Real-Time DVFS Schedulers in Linux, 2012.

Matthew Travers, μSystems Research Group, School of Electrical and Electronic Engineering, CPU Power Consumption Experiments and Results Analysis of Intel i7-4820K, Jun. 1, 2015.

Andrei Frumusanu, The Samsung Exynos 7420 Deep Dive—Inside a Modern 14nm SoC, Jun. 29, 2020.

Scott Bicheno, Qualcomm talks up new Snapdragon, Nov. 18, 2010.

* cited by examiner

[Fig. 1]
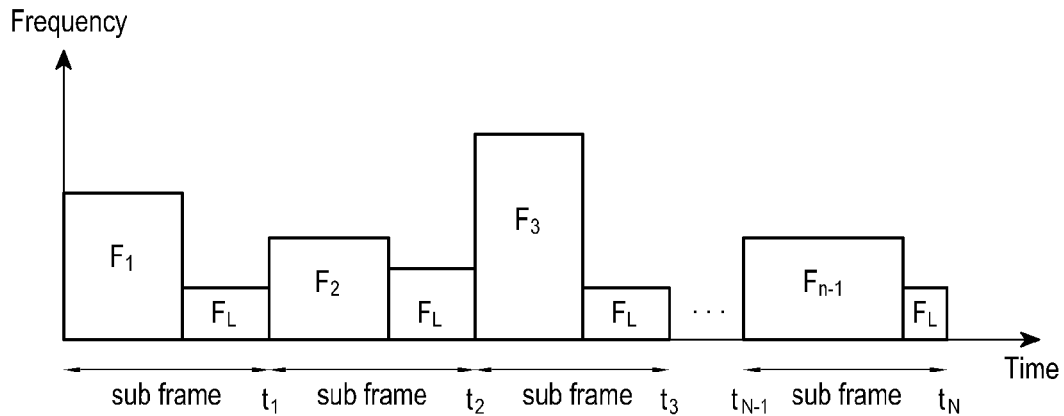
[Fig. 2]
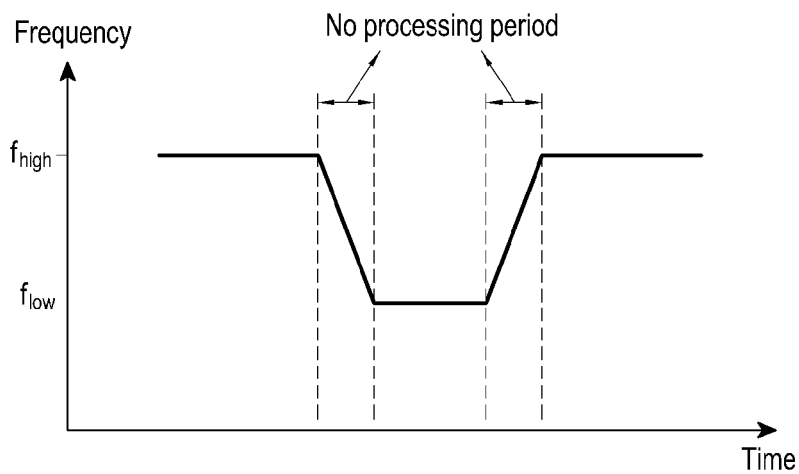
[Fig. 3]
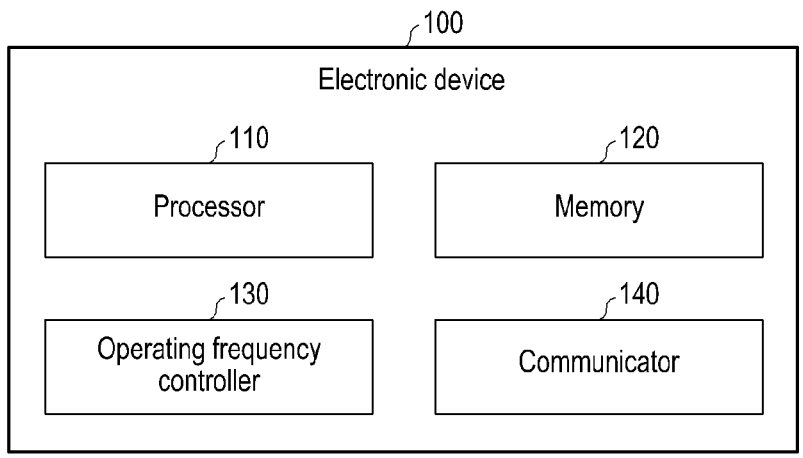

[Fig. 4]
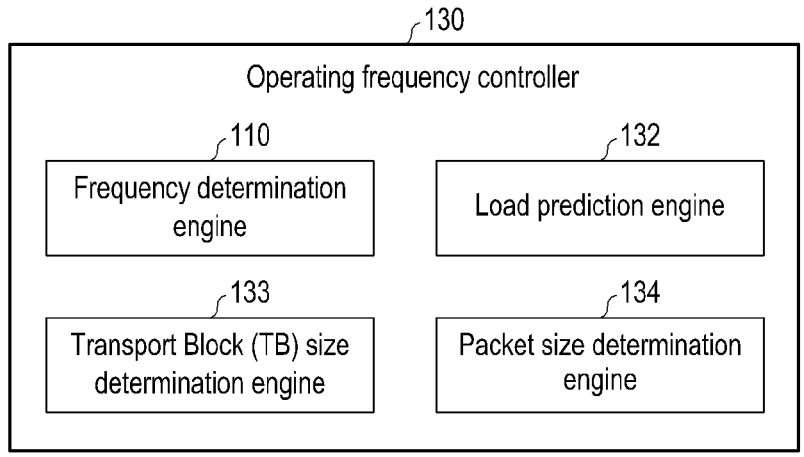
[Fig. 5]
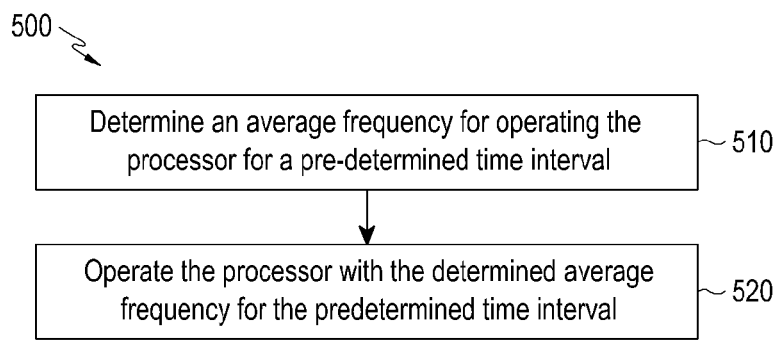
[Fig. 6]
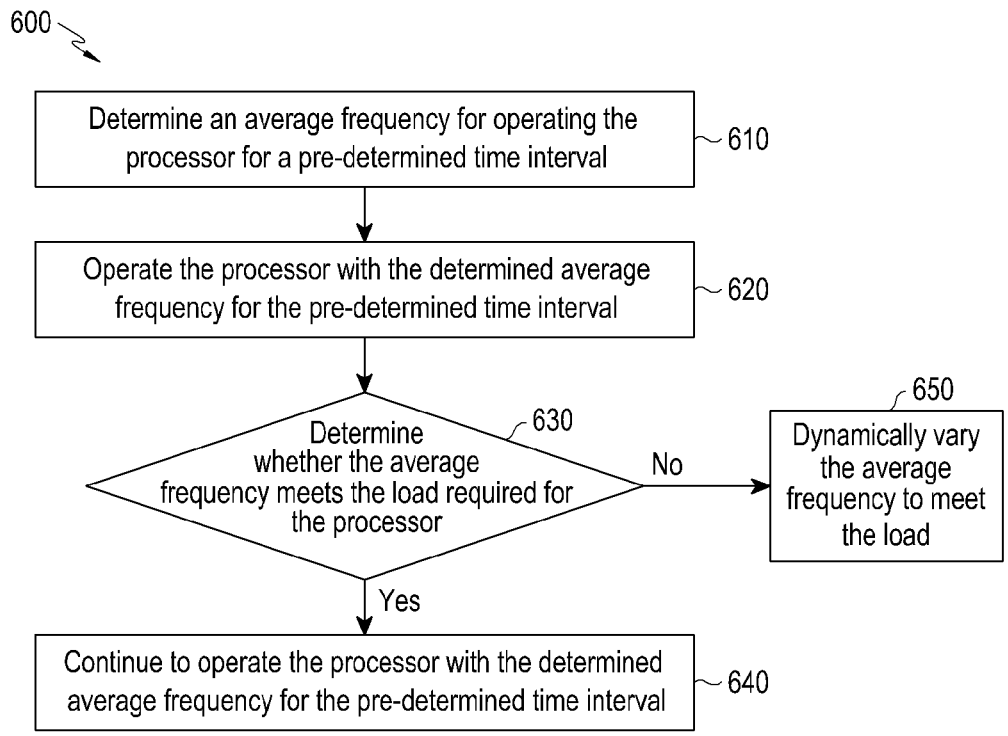

[Fig. 7]
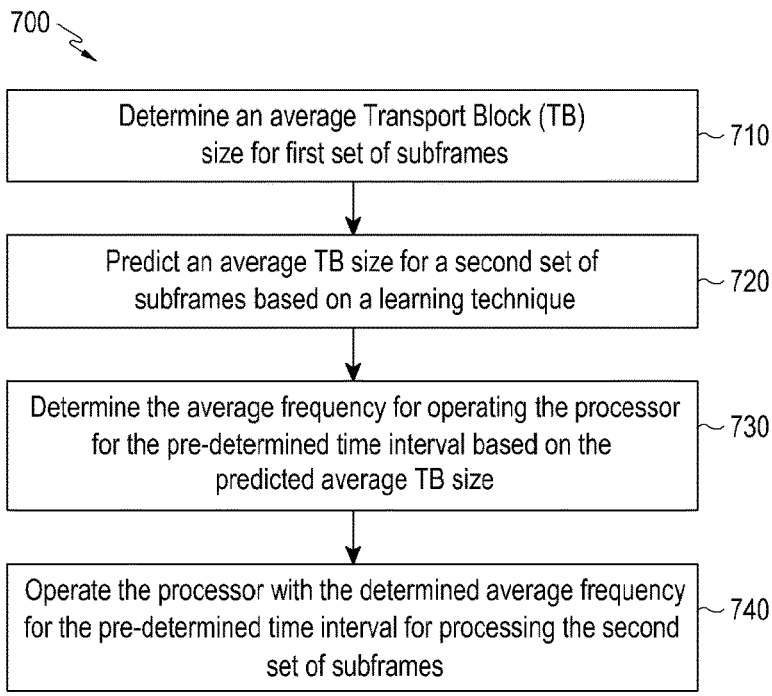
[Fig. 8]
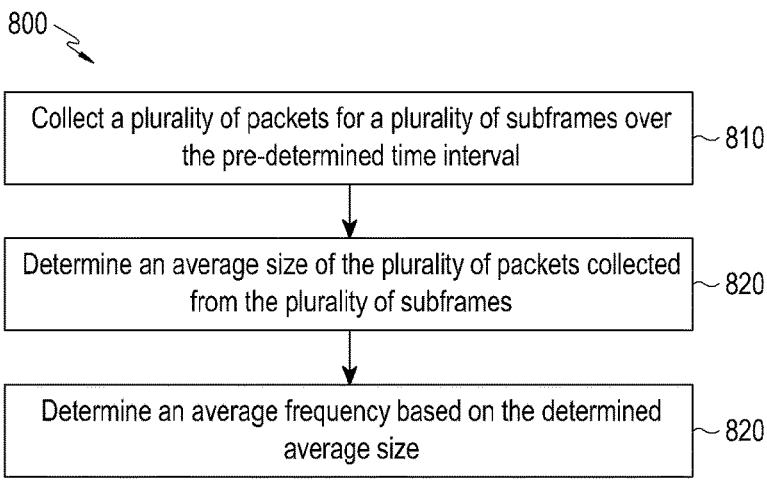
[Fig. 9A]
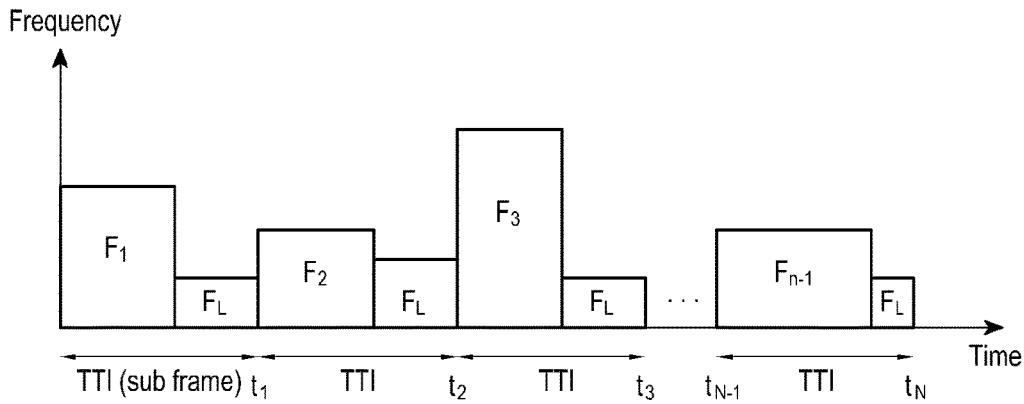

[Fig. 9B]
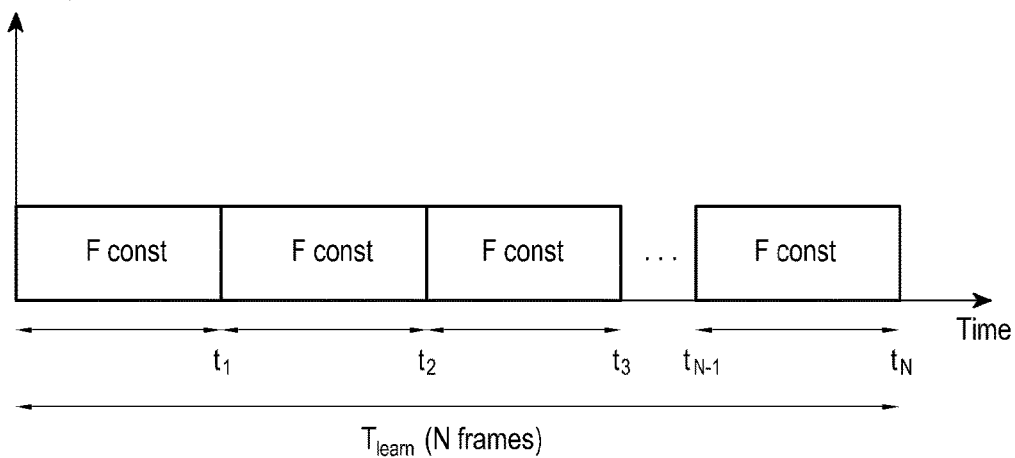
[Fig. 10]
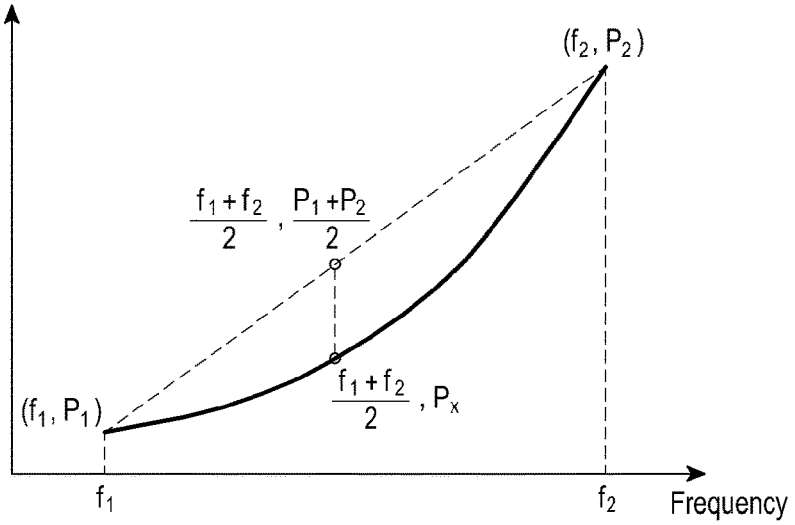
[Fig. 11]
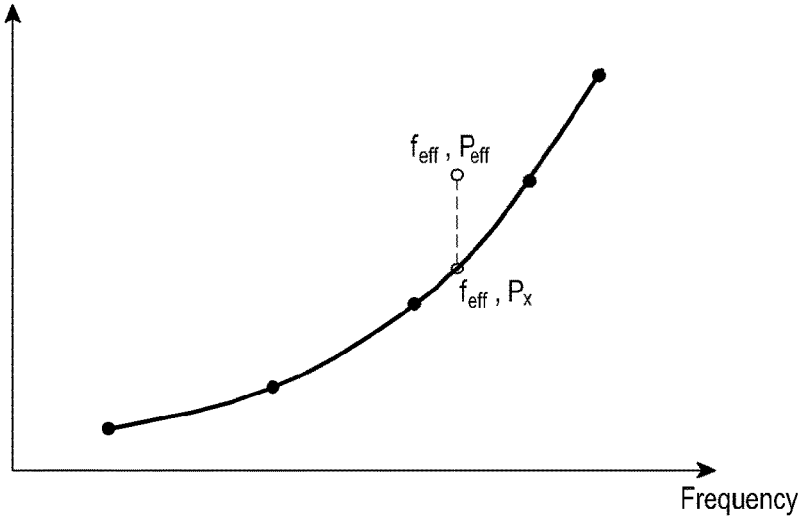

[Fig. 12]
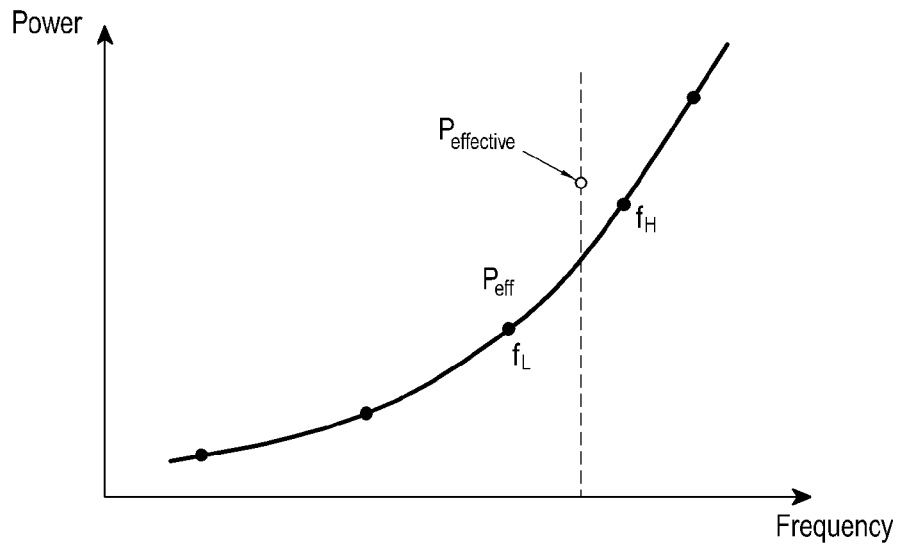
[Fig. 13]
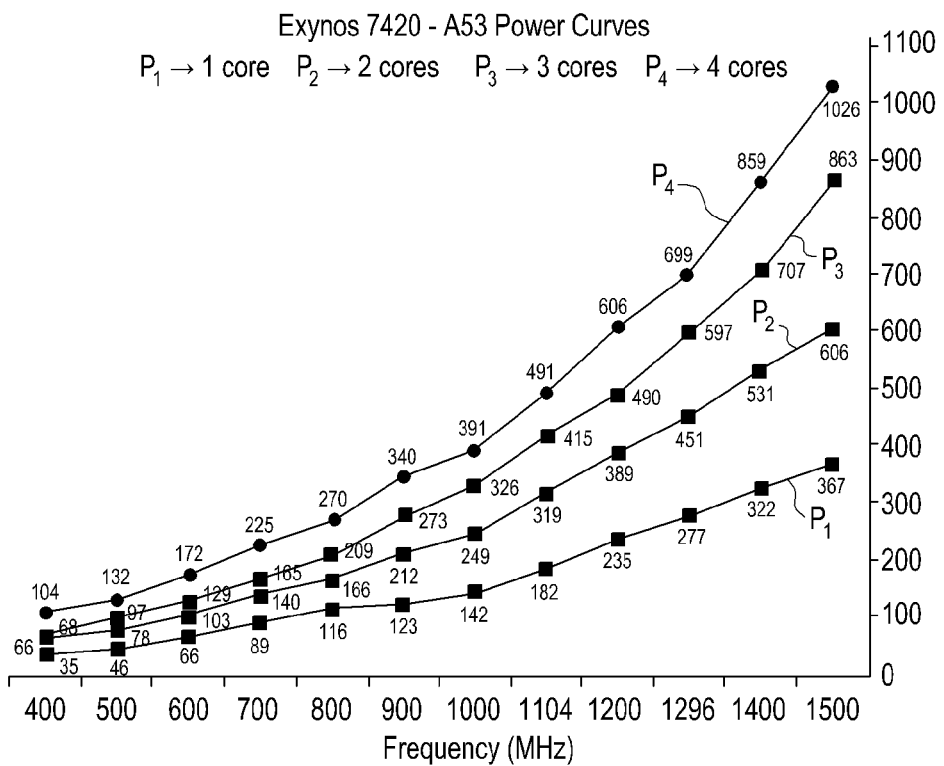

[Fig. 14]
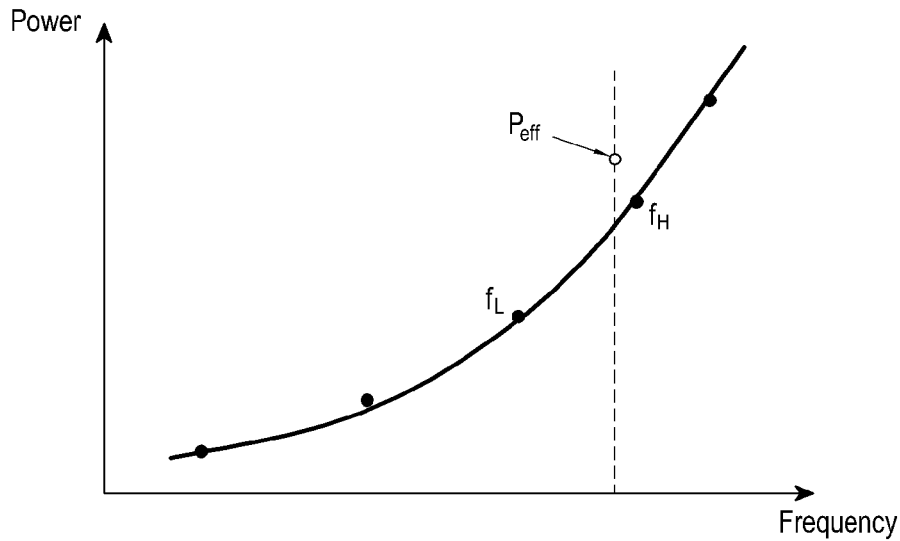
[Fig. 15]
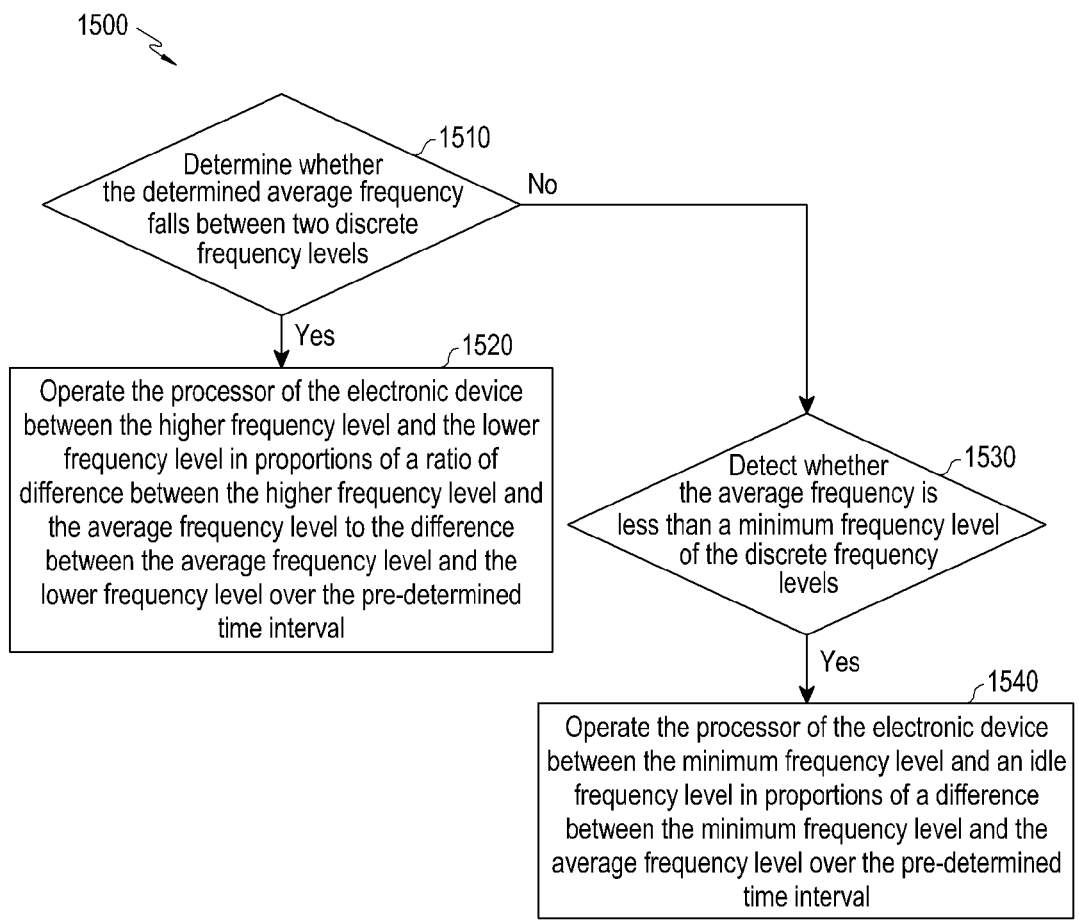

[Fig. 16]
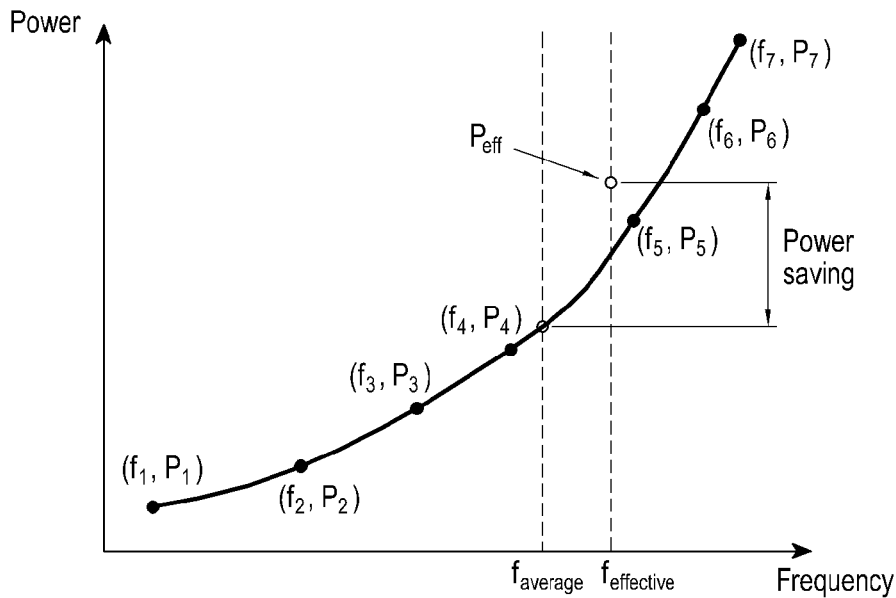
[Fig. 17]
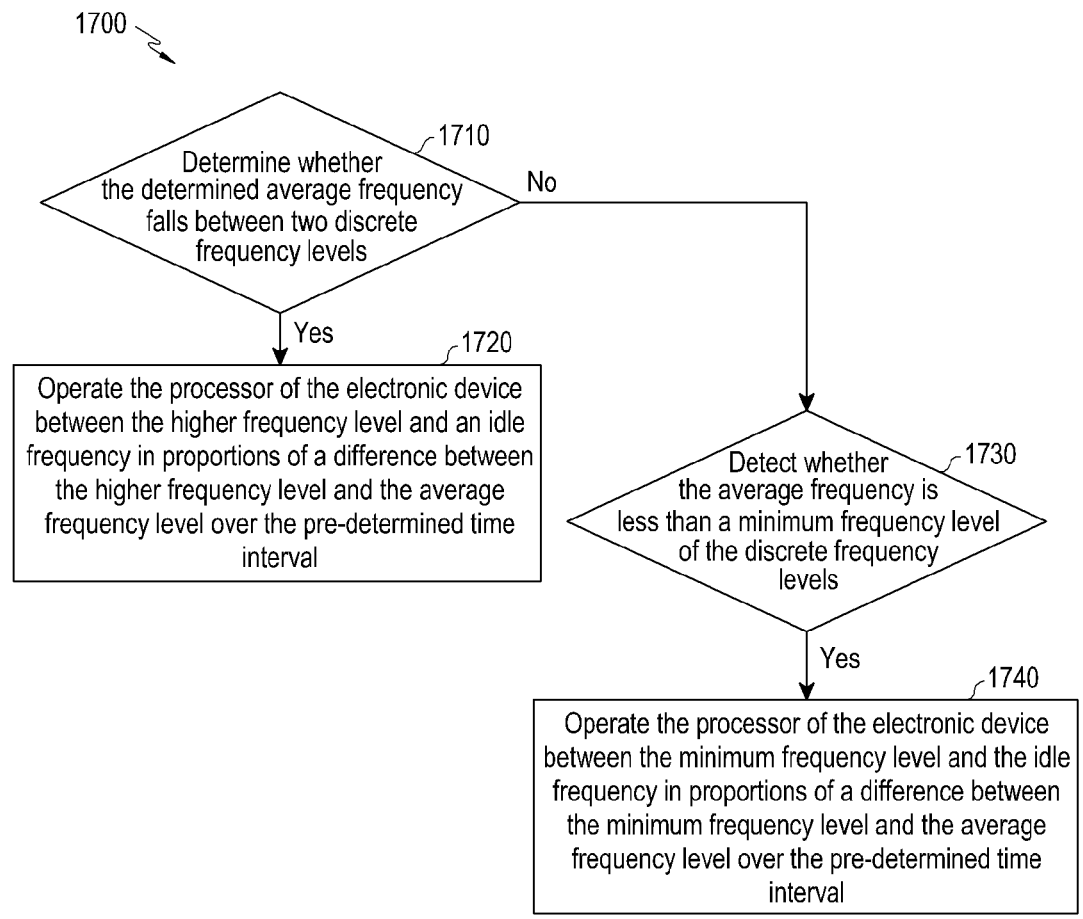

[Fig. 18]
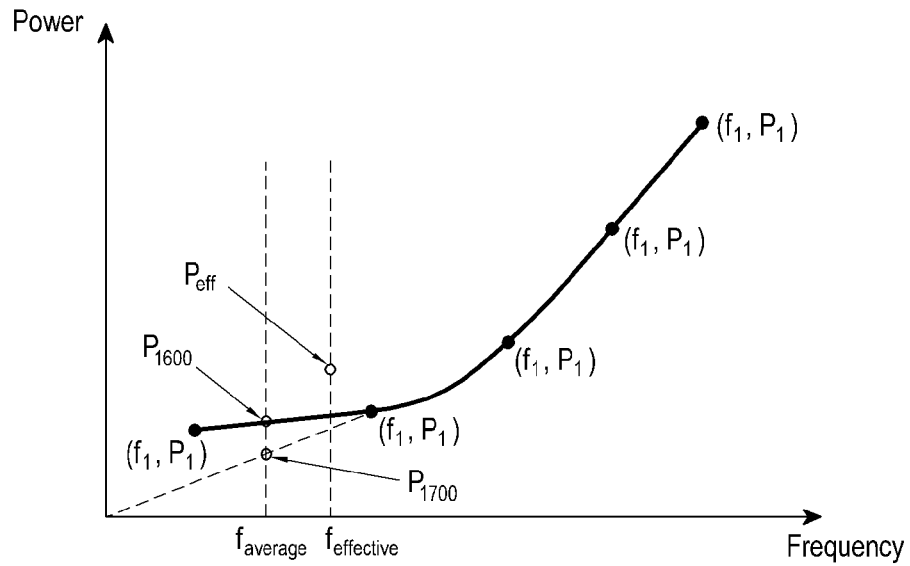
[Fig. 19]
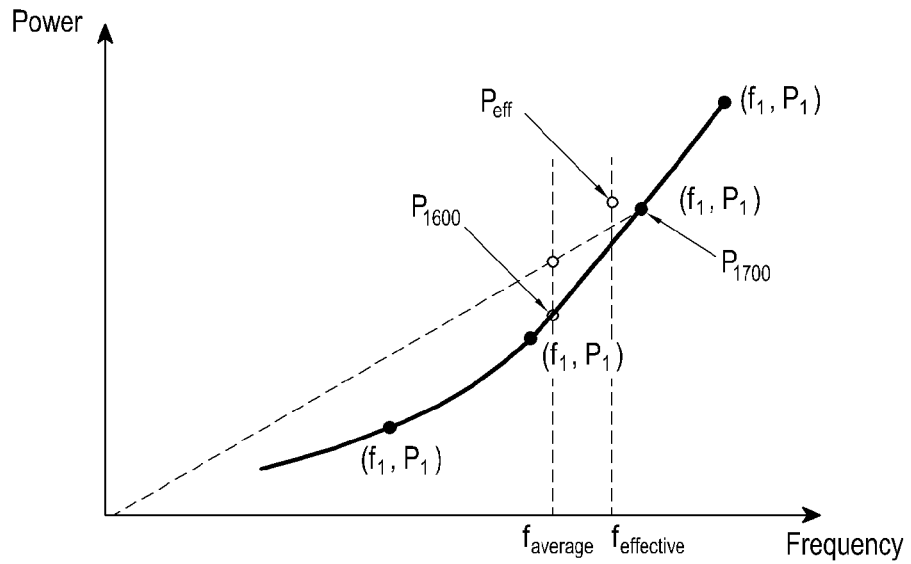

[Fig. 21]
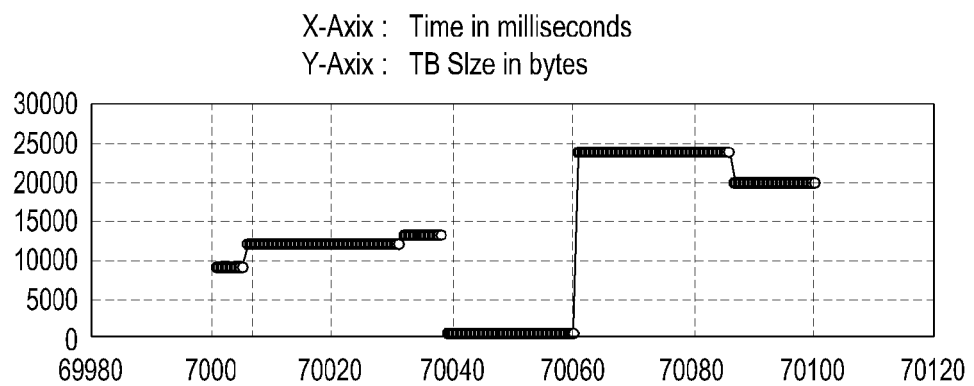
[Fig. 22]
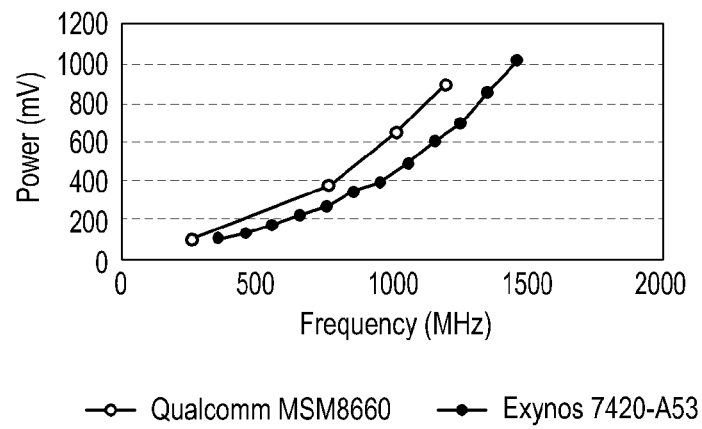

METHOD AND APPARATUS FOR OPERATING A PROCESSOR IN AN ELECTRONIC DEVICE

CROSS-REFERENCE TO RELATED APPLICATION(S)

This application is a National Phase Entry of PCT International Application No. PCT/KR2018/015774, which was filed on Dec. 12, 2018, and claims priority to Indian Provisional Patent Application No. 201741044617 filed on Dec. 12, 2017, and Indian Complete Patent Application No. 201741044617 filed on Oct. 17, 2018, in the Indian Intellectual Property Office, the content of each of which are incorporated herein by reference.

TECHNICAL FIELD

This disclosure relates to an electronic device, and more particularly relates to a method and apparatus for operating a processor in an electronic device.

BACKGROUND ART

With the increased usage of an electronic device, various hardware components (e.g., a processor or the like) in the electronic device are utilized to support a variety of functions. Further, each hardware components of the electronic device consumes a finite amount of power, which results in increasing a power consumption and reduces a battery life of the electronic device. Dynamic voltage and frequency scaling (DVFS) technique is a well-known technique used to perform power management on the electronic device. The DVFS technique can be used to control voltage and/or a frequency of the hardware component based on various parameters such as processing load. Using the DVFS technique, regulating voltage (V) provides a fixed range of frequencies, as the voltage is directly proportional to an operated frequency. A total power consumption of a central processing unit (CPU) associated with the electronic device is given below:

$$P_{CPU} = (m*V) + (\alpha * E_{short-circuit} * f) + (\alpha \frac{1}{2} CV^2 f)$$

The power consumption of the CPU is directly proportional to the operating frequency, the power consumption of the CPU can be reduced by regulating the operating frequency.

For instance, consider that the electronic device is a low data rate system such as a video camcorder, when there is a high processing load at the processor then, the DVFS technique can increase the voltage and/or the frequency of the processor to meet the processing load. On the other hand, when the power consumption needs to be decreased, the voltage and/or the frequency of the processor of the video camcorder may be lowered.

Consider another scenario that the electronic device is a high data rate embedded system such as cellular wireless modem (e.g., 4G/5G modems), where data packets will arrive at a fixed and defined rate such as one packet at every sub-frame. Based on a size of the packets received on one subframe, the operating frequency can be determined. Further, the cellular wireless modem can determine an idle time duration based on a received size of the packet at the every sub-frame. Using the DVFS technique, the operating frequency and/or an operating voltage of the processor is changed based on operation modes (e.g., an active mode and an idle mode) of the cellular wireless modem. As the subframe size of the 5G modem is very less, the rate of changing the operating frequency between the high frequency and the low frequency is high. However, the processor needs to frequently switch between a high frequency and a low frequency at a same rate of high packet arriving rate. FIG. 1 illustrates a graph depicting a power consumption of the processor. As shown in the FIG. 1, there is a frequent switching between the low frequency and the high frequency for every sub-frame received at the processor. Hence, the processor of the cellular wireless modem can consume more power instead of saving power.

DISCLOSURE OF INVENTION

Technical Problem

Hence, there is a power loss due to a frequent switching of the frequency levels. As shown in FIG. 2, there is no processing done by the processor during a transition time between a higher frequency level and a lower frequency level. Further, when a step size during the transition between the higher frequency level and the lower frequency level is high, then there exists a high power loss. This results in increase in the power consumption of the electronic device.

Thus, it is desired to address the above mentioned disadvantages or other shortcomings or at least provide a useful alternative.

Solution to Problem

An embodiment of the disclosure may provide to provide a method and apparatus for operating a processor in an electronic device.

An embodiment of the disclosure may provide a method and apparatus to determine an average frequency for operating the processor for a predetermined time interval.

An embodiment of the disclosure may provide a method and apparatus to operate the processor with the determined average frequency for the predetermined time interval.

An embodiment of the disclosure may provide a method and apparatus to determine the average frequency based on an average load predicted at the processor.

An embodiment of the disclosure may provide a method and apparatus to predict the average load at the processor for the predetermined time interval based on at least one of a modulation coding scheme (MCS), a coding rate, and a number of resource blocks (RBs).

An embodiment of the disclosure may provide a method and apparatus to monitor a transport block (TB) size for a first set of subframes.

An embodiment of the disclosure may provide a method and apparatus to predict an average TB size for a second set of subframes based on a learning technique.

An embodiment of the disclosure may provide a method and apparatus to determine the average frequency for operating the processor for the predetermined time interval based on the predicted average TB size.

An embodiment of the disclosure may provide a method and apparatus to operate the processor with the determined average frequency for the predetermined time interval for processing the second set of subframes.

An embodiment of the disclosure may provide a method and apparatus to determine whether the average frequency meets the load required for the processor.

An embodiment of the disclosure may provide a method and apparatus to dynamically vary the average frequency to meet the load in response to determining that the average frequency fails to meet the load.

An embodiment of the disclosure may provide a method and apparatus to collect a plurality of packets for a plurality of subframes over the predetermined time interval.

An embodiment of the disclosure may provide a method and apparatus to determine an average size of the plurality of packets collected from the plurality of subframes.

An embodiment of the disclosure may provide a method and apparatus to determine the average frequency based on the determined average size.

Accordingly the embodiments herein provide a method for operating a processor in an electronic device. The method includes identifying an average throughput for a first set of subframes, predicting a load of the processor for a second set of subframes based on the identified average throughput, determining an operating frequency of the processor for the second set of subframes based on the predicted load, and operating the processor on the determined operating frequency for the second set of subframes.

In an embodiment, the method includes determining an average frequency for operating the processor for a predetermined time interval. Further, the method includes operating the processor with the determined average frequency for the predetermined time interval.

In an embodiment, the average frequency is determined based on an average load predicted at the processor.

In an embodiment, the average load at the processor is predicted for a predetermined time interval based on a modulation coding scheme (MCS), a coding rate, and a number of resource blocks (RBs)

In an embodiment, determining the average frequency for operating the processor for the predetermined time interval includes monitoring a transport block (TB) size for first set of subframes. Further, the method includes predicting an average TB size for a second set of subframes based on a learning technique. Further, the method includes determining the average frequency for operating the processor for the predetermined time interval based on the predicted average TB size. Furthermore, the method includes operating the processor with the determined average frequency for the predetermined time interval for processing the second set of subframes.

In an embodiment, the method further comprises determining whether the average frequency meets the load requirement of the processor and dynamically varying the average frequency to meet the load in response to determining that the average frequency fails to meet the load.

In an embodiment, determining an average frequency for operating the processor for the predetermined time interval includes collecting a plurality of packets for a plurality of subframes over the predetermined time interval. Further, the method includes determining an average size of the plurality of packets collected from the plurality of subframes and determining the average frequency based on the determined average size.

In an embodiment, operating the processor with the determined average frequency for the predetermined time interval includes determining whether the determined average frequency falls between two discrete frequency levels, in which the two discrete frequency levels comprises a lower frequency level and a higher frequency level, when the processor of the electronic device operates at one of the discrete frequency levels. Further, causing the electronic device to perform one of:

a. operating the processor of the electronic device between the higher frequency level and the lower frequency level in proportions of a ratio of difference between the higher frequency level and the average frequency level to the difference between the average frequency level and the lower frequency level over the predetermined time interval, in response to determining that the determined average frequency falls between two discrete frequency levels;

b. detecting whether the average frequency is less than a minimum frequency level of the discrete frequency levels, in response to determining that the determined average frequency does not falls between two discrete frequency levels, and operating the processor of the electronic device between the minimum frequency level and an idle frequency level in proportions of a difference between the minimum frequency level and the average frequency level over the predetermined time interval.

In an embodiment, operating the processor with the determined average frequency for the predetermined time interval includes determining whether the determined average frequency falls between two discrete frequency levels, in which the two discrete frequency levels comprises a lower frequency level and a higher frequency level, when the processor of the electronic device operates at one of the discrete frequency levels. Further, causing the electronic device to perform one of:

a. operating the processor of the electronic device between the higher frequency level and an idle frequency in proportions of a difference between the higher frequency level and the average frequency level over the predetermined time interval, in response to determining that the determined average frequency falls between two discrete frequency levels, b. detect whether the average frequency is less than a minimum frequency level of the discrete frequency levels, in response to determining that the determined average frequency does not falls between two discrete frequency levels, and operating the processor of the electronic device between the minimum frequency level and the idle frequency in proportions of a difference between the minimum frequency level and the average frequency level over the predetermined time interval.

In an embodiment, operating the processor with the determined average frequency for the predetermined time interval includes determining whether a ratio between a power and a frequency associated with the higher frequency level is comparatively greater than the ratio between the power and the frequency associated with the lower frequency level, in response to determining that the determined average frequency falls between two discrete frequency levels. Further, causing the electronic device to perform one of:

a. operating the processor of the electronic device between the higher frequency level and the lower frequency level in proportions of a ratio of difference between the higher frequency level and the average frequency level to the difference between the average frequency level and the lower frequency level over the predetermined time interval, in response to determining that the ratio between the power and the frequency associated with the higher frequency level is comparatively greater than ratio between the power and the frequency associated with the lower frequency level, operating the processor of the electronic device between the higher frequency level and an idle frequency in proportions of a difference between the higher frequency level and the average frequency level over the predetermined time interval, in response to determining that the ratio between the power and the frequency associated with the higher frequency level is not greater than ratio between the power and the frequency associated with the lower frequency level.

Further, the method includes detecting whether the average frequency is less than a minimum frequency level of the discrete frequency levels, in response to determining that the determined average frequency does not falls between two discrete frequency levels, and operating the processor of the electronic device between the minimum frequency level and the idle frequency in proportions of a difference between the minimum frequency level and the average frequency level over the predetermined timer interval.

Accordingly the embodiments herein provide an electronic device for operating a processor. The electronic device includes a memory, a processor, and a controller coupled with the memory and the processor, configured to identify an average throughput for a first set of subframes, predict a load of the processor for a second set of subframes based on the identified average throughput, determine an operating frequency of the processor for the second set of subframes based on the predicted load, and operate the processor on the determined operating frequency for the second set of subframes.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments herein will be better understood from the following detailed description with reference to the drawings, in which:

FIG. 1 is a graph depicting a power consumption of a processor of an electronic device, according to a prior art;

FIG. 2 is a graph depicting a power loss of the electronic device due to frequency transitions according to a prior art;

FIG. 3 is a block diagram illustrating the electronic device, according to an embodiment as disclosed herein;

FIG. 4 is a block diagram illustrating various hardware components of an operating frequency controller of the electronic device, according to an embodiment as disclosed herein;

FIG. 5 is a flow diagram illustrating various operations for operating the processor of the electronic device with an average frequency for a predetermined time interval, according to an embodiment as disclosed herein;

FIG. 6 is a flow diagram illustrating various operations for operating the processor of the electronic device with the average frequency for the predetermined time interval based on a learning technique, according to an embodiment as disclosed herein;

FIG. 7 is a flow diagram illustrating various operations for determining the average frequency for the predetermined time interval based on the learning technique, according to an embodiment as disclosed herein;

FIG. 8 is a flow diagram illustrating various operations for determining the average frequency for the predetermined time interval based on a deterministic technique, according to an embodiment as disclosed herein;

FIG. 9A is an example scenario in which the electronic device operates the processor by switching between various frequency levels, according to a prior art;

FIG. 9B are an example illustrations of operating the processor of the electronic device with the average frequency, according to an embodiment as disclosed herein;

FIG. 10 is an example illustration of operating the processor of the electronic device with the average frequency for power saving, according to an embodiment as disclosed herein;

FIG. 11 is an example illustration of operating the processor of the electronic device with the average frequency, according to an embodiment as disclosed herein;

FIG. 12 is an example illustration of operating the processor of the electronic device with the average frequency for power saving, according to an embodiment as disclosed herein;

FIG. 13 is an example illustration of a power level of a multi-core processor in the electronic device, according to an embodiment as disclosed herein;

FIG. 14 is an example illustration of an effective power of the processor associated with electronic device when the average frequency falls between two discrete frequency levels, according to an embodiment as disclosed herein;

FIG. 15 is a flow diagram illustrating various operations for operating the processor of the electronic device with the average frequency, when the determined average frequency falls between two discrete frequency levels, according to an embodiment as disclosed herein;

FIG. 16 is an example illustration of the effective power of the processor associated with the electronic device when the average frequency falls between two discrete frequency levels, according to an embodiment as disclosed herein;

FIG. 17 is a flow diagram illustrating various operations for operating the processor of the electronic device with the average frequency, when the determined average frequency falls between two discrete frequency levels, according to an embodiment as disclosed herein;

FIG. 18 and FIG. 19 are example illustrations of the effective power of the processor associated with the electronic device when the average frequency falls between two discrete frequency levels, according to an embodiment as disclosed herein;

FIG. 21 is an example illustration of received TB size at the processor of the electronic device, according to an embodiment as disclosed herein; and FIG. 22 is an example illustration of the power level while operating the processor of the electronic device at the average frequency, according to an embodiment as disclosed herein.

MODE FOR THE INVENTION

Figure 20:
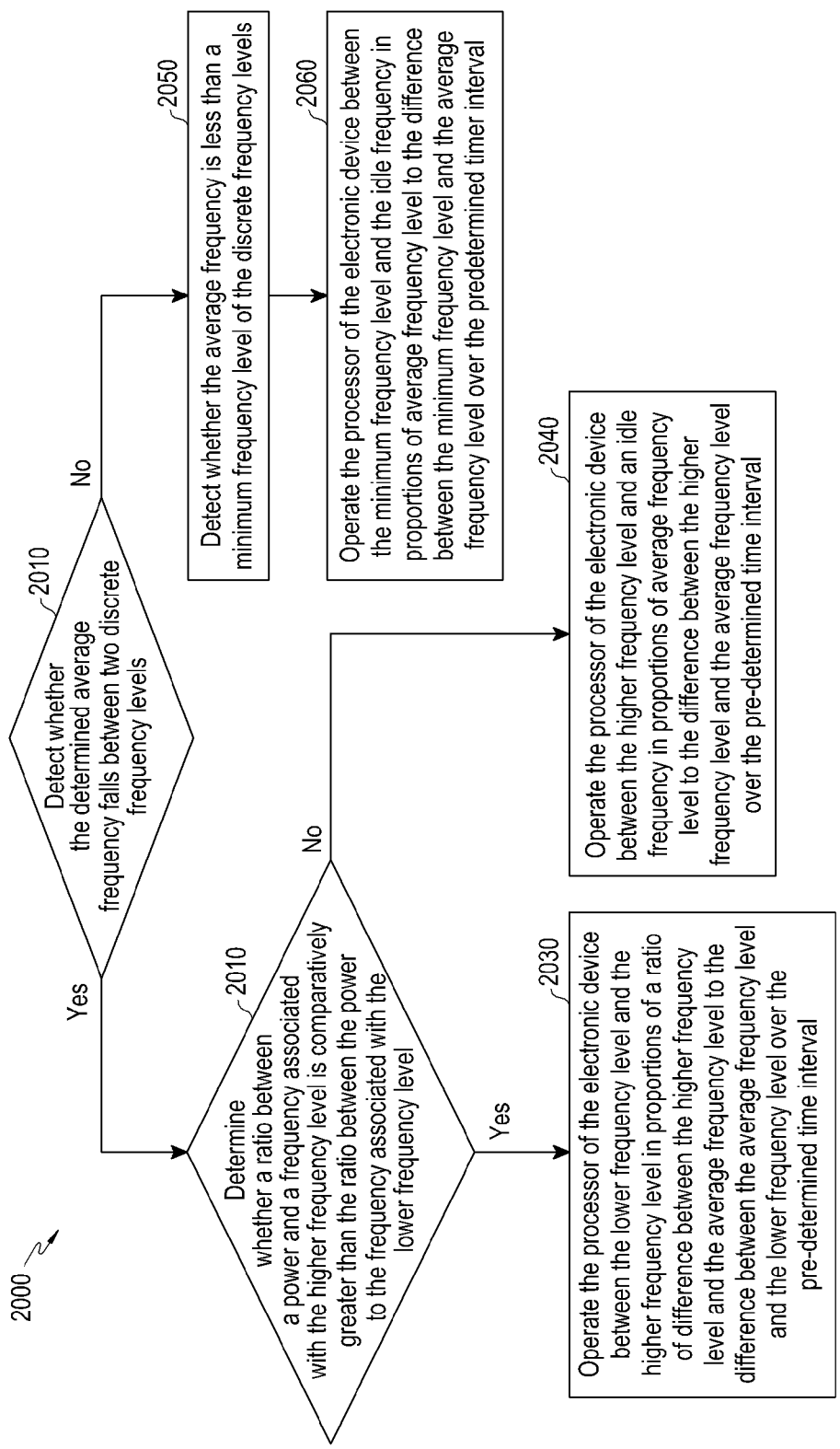
FIG. 20 is a flow diagram illustrating various operations for operating the processor of the electronic device with the average frequency, when the determined average frequency falls between two discrete frequency levels, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, storage circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Embodiments herein provide a method for operating a processor in an electronic device. The method includes determining an average frequency for operating the processor for a predetermined time interval. Further, the method includes operating the processor with the determined average frequency for the predetermined time interval.

In the conventional methods, using a DVFS technique, the electronic device can switch the frequency dynamically based on a processing load. However, this results in a frequent frequency switching which consumes more power in the electronic device. Unlike conventional methods and systems, the proposed method can be used to improve a power saving on the electronic device, even a processing load of the electronic device varies dynamically. The proposed method can be used to reduce the power consumption by applying the average frequency (i.e., constant frequency over a long period of time) to the processor of the electronic device. Hence, this results in power saving and increase a battery life of the electronic device.

The proposed method can be used in high data rate electronic device (e.g., 5G modem), where the subframe duration is very short. The proposed method can be used to accumulate the plurality of subframe in a buffer and then compute the average frequency for the accumulated packets. Further, the average frequency is applied across the accumulated subframes. This results in reducing the power consumption, as the average frequency is applied over the accumulated subframes.

Referring now to the drawings, and more particularly to FIG. 3 to FIG. 8, FIG. 9B to FIG. 25, there are shown preferred embodiments.

FIG. 3 is a block diagram illustrating an electronic device 100, according to an embodiment as disclosed herein. In an embodiment, the electronic device 100 includes a processor 110, a memory 120, an operating frequency controller 130, and a communicator 140.

In an embodiment, the electronic device 100 is a wireless communications device which is configured to operate in any wireless network such as, a wireless local area network (WLAN), a cellular network (e.g., long term evolution (LTE), fifth generation (5G) or the like. The electronic device 100 can be for example but not limited to a user equipment (UE), a smart phone, a mobile phone, wireless modems (e.g., 4G/5G modems), internet of things (IoT) devices, wireless gigabit alliance (WiGig) modems, ultra high speed (UHS) flash memory, solid-state drive (SSD), a desktop computer, a laptop computer, a digital camera, a video camcorder, a portable multimedia player (PMP), a MP3 player, a navigation device, or the like.

The processor 110 can be for example a communication processor such as Snapdragon®, Exynos®, a system on chip (SOC), an application specific processor such as image processor, or the like. Further, the processor 110 may include a hardware component such as central processing unit (CPU), a microcontroller, an application-specific integrated circuit (ASIC), a graphic processing unit (GPU), or the like to perform various operations. In an example, the processor 110 may be embodied as a system-on-chip (SoC) in which a core and the GPU may be integrated. In an example, the processor 110 may include a plurality of processors or processor cores.

In an embodiment, the electronic device 100 determines an average frequency for operating the processor 110 for a predetermined time interval. The predetermined time interval can be next N frames. For example, the next N frames can be next 100 frames which will be received at the processor 110. The electronic device 100 predicts the average load at the processor 110 for a predetermined time interval based on an average throughput at the processor 110. The electronic device 100 is configured to determine the average frequency based on the average load predicted at the processor 110. The electronic device 100 determines the average frequency during a run-time of the processor 110. In an example, a load at the processor 110 is determined based on a received packet size, a buffer occupancy level or the like. The packet size may vary significantly in every subframe. In an embodiment, the predicted load is a CPU load, where the CPU load can be at least one of a CPU utilization or an application specific metric.

In an embodiment, the electronic device 100 predicts the average throughput for the predetermined time interval (such as next hundreds of frames) based on a learning technique. The predetermined time interval is much higher than the subframe time interval. The learning technique can be for example but not limited to a neural network, a reinforcement learning such as Q-learning approach, a machine learning technique, or the like.

In an embodiment, the electronic device 100 predicts the average throughput, where the average throughput is determined based on an average transport block (TB) size of sub frames. The TB size is an effective packet size per subframe. The electronic device 100 predicts the average TB size over several subframes using parameters based on the learning technique. The parameters can be for example a coding rate, modulation coding scheme (MCS), number of radio resource blocks (RBs) allocated by a base station to the UE. Consider for next 100 frames, the electronic device 100 predicts the average packet size which could be received on the next 100 subframes based on a previous subframes size.

Based on the average load (i.e., TB size) predicted at the processor 110, the electronic device 100 determines the average frequency. Further, the operating frequency controller 130 operates the processor 110 with the determined average frequency for the predetermined time interval.

In an embodiment, the electronic device 100 monitors the TB size for a first set of subframes. Further, the electronic device 100 predicts the average TB size for a second set of subframes based on the learning technique. Further, the electronic device 100 determines the average frequency for operating the processor 110 for the predetermined time interval based on the predicted average TB size. Further, the operating frequency controller 130 operates the processor 110 with the determined average frequency for the predetermined time interval for processing the second set of subframes. The electronic device is configured to map between predicted TB size and the average frequency. Let, a range of average TB size can be from 100 bytes to 900 bytes. Consider the electronic device determines that for first n-subframe, learnt average TB size is 100 bytes. Similarly for second n-subframe, the learnt average TB size is 500 bytes and for third n-subframe, the learnt average TB size is 200 bytes.

In an embodiment, the electronic device 100 determines whether the determined average frequency meets a load required for the processor 110. The load is the actual load which is required for the processor of the electronic device 100. Further, the electronic device 100 dynamically vary the average frequency to meet the predicted load in response to determining that the average frequency fails to meet the predicted load.

For example, consider for N-subframes (such as 100 subframes), the electronic device 100 predicts that the average frequency to operate the load received at the processor 110 is 100 MHz. Further, the processor 110 operates at the average frequency (i.e., 100 MHz) for 100 subframes. The electronic device 100 determines whether the average frequency of the N/10 subframe (such as 10 subframe) is same as the predicted average frequency over 100 subframes. If the average frequency of the N/10 subframe (such as 10 subframe) is greater than the predicted average frequency over 100 subframes, then the electronic device 100 determines that there is an error in the learning technique. The electronic device 100 identifies that an operating frequency (i.e., predicted average frequency) of the processor 110 is less than the average frequency required for operating the predicted load, this results in not reaching the deadline.

Further, the electronic device 100 is configured to increase the average frequency to meet a deadline (i.e., predicted load). This ensure that the electronic device 100 meets the deadline, while operating at the predicted average frequency.

In another embodiment, the electronic device 100 determines the average frequency for operating the processor 110 for the predetermined time interval using a deterministic technique. In the deterministic technique, the electronic device 100 collects a plurality of packets for a plurality of subframes over the predetermined time interval, where the plurality of packets are stored in the memory 120. The electronic device 100 accumulates the plurality of packets, where the plurality of packets are not processed. The predetermined time interval at which plurality of packets are accumulated is based on an allowable latency (such as delay) at the electronic device 100. For example, the allowable latency for 5G system is between 10 ms-100 ms then, the average duration of subframes in 5G system is 50 μs. This result in accumulating too many subframes in the memory 120. Further, the electronic device 100 determines an average size of the plurality of packets collected from the plurality of subframes. Further, the electronic device 100 determines average size of the plurality of packets collected from the plurality of subframes. Further, the electronic device 100 determines the average frequency based on the determined average size. The electronic device 100 determines computes the average frequency to process the accumulated buffer in the next predetermined time interval. Furthermore, the operating frequency controller 130 operates the processor 110 with the determined average frequency for the predetermined time interval.

In an embodiment, the operating frequency controller 130 operates the processor 110 with the determined average frequency for the predetermined time interval includes determining whether the determined average frequency falls between two discrete frequency levels. The two discrete frequency levels comprises a lower frequency level and a higher frequency level, where the processor 110 of the electronic device 100 operates at one of the discrete frequency levels. Further, the operating frequency controller 130 causes to operate the processor 110 includes between the higher frequency level and the lower frequency level in proportions of a ratio of difference between the higher frequency level and the average frequency level to the difference between the average frequency level and the lower frequency level over the predetermined time interval.

If the determined average frequency falls between two discrete frequency levels, the electronic device 100 detects whether the average frequency is less than a minimum frequency level of the discrete frequency levels. Further, the operating frequency controller 130 operates the processor 110 between the minimum frequency level and an idle frequency level in proportions of a difference between the minimum frequency level and the average frequency level over the predetermined time interval.

In another embodiment, the operating frequency controller 130 operates the processor 110 with the determined average frequency for the predetermined time interval includes determining whether the determined average frequency falls between two discrete frequency levels. Further, the operating frequency controller 130 causes to operate the processor 110 the higher frequency level and an idle frequency level in proportions of a difference between the higher frequency level and the average frequency level over the predetermined time interval, in response to determining that the determined average frequency falls between two discrete frequency levels. In an example, the idle frequency level is a lowest frequency level of the discrete frequency levels.

If the determined average frequency does not fall between two discrete frequency levels, the electronic device 100 detects whether the average frequency is less than a minimum frequency level of the discrete frequency levels. Further, the operating frequency controller 130 operates the processor 110 between the minimum frequency level and the idle frequency level in proportions of a difference between the minimum frequency level and the average frequency level over the predetermined time interval.

In yet another embodiment, the electronic device 100 operates the processor 110 with the determined average frequency for the predetermined time interval includes determining whether the determined average frequency falls between two discrete frequency levels. Further, the electronic device 100 determines whether a ratio between a power and a frequency associated with the higher frequency level is comparatively greater than the ratio between the power and the frequency associated with the lower frequency level. Further, the operating frequency controller 130 to operate the processor 110 between the higher frequency level and the lower frequency level in proportions of the ratio of difference between the higher frequency level and the average frequency level to the difference between the average frequency level and the lower frequency level over the predetermined time interval.

If the ratio between the power and the frequency associated with the higher frequency level is not greater than the ratio between the power and the frequency associated with the lower frequency level, the operating frequency controller 130 operates the processor 110 of the electronic device 100 between the higher frequency level and the idle frequency level in proportions of a difference between the higher frequency level and the average frequency level over the predetermined time interval.

If the determined average frequency does not falls between two discrete frequency levels then, the frequency determination engine 131 to detect whether the average frequency is less than the minimum frequency level of the discrete frequency levels. Further, the operating frequency controller 130 to operate the processor 110 of the electronic device 100 between the minimum frequency level and the idle frequency in proportions of a difference between the minimum frequency level and the average frequency level over the predetermined timer interval.

The communicator 140 is configured to communicate internally between hardware components in the electronic device 100. The processor 110 is coupled with the memory 120 for processing various instructions stored in the memory 120 to meet the predicted load at the electronic device.

The memory 120 can be configured to store the plurality of subframes, number of RBs received from the base station. The memory 120 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than the memory. In certain examples, a non-transitory storage medium may store data that can, over time, change (e.g., in random access memory (RAM) or cache).

FIG. 4 is a block diagram illustrating various hardware components of the operating frequency controller 130 of the electronic device 100, according to an embodiment as disclosed herein. In an embodiment, the operating frequency controller 130 includes a frequency determination engine 131, a load prediction engine 132, a TB size determination engine 133, and a packet size determination engine 134.

In an embodiment, the frequency determination engine 131 determines the average frequency for operating the processor 110 for the predetermined time interval. The load prediction engine 132 predicts the average load at the processor 110 for the predetermined time interval based on the average throughput at the processor 110. The frequency determination engine 131 is configured to determine the average frequency based on the average load predicted at the processor 110.

In an embodiment, the frequency determination engine 131 predicts the average throughput for the predetermined time interval (such as next hundreds of frames) based on the learning technique.

In an embodiment, the frequency determination engine 131 predicts the average throughput, where the average throughput is determined based on an average TB size of sub frames. The TB size determination engine 133 determines the average TB size over several subframes using parameters based on the learning technique.

Based on the average load (i.e., TB size) predicted at the processor 110, the frequency determination engine 131 determines the average frequency. Further, the operating frequency controller 130 operates the processor 110 with the determined average frequency for the predetermined time interval.

In an embodiment, the TB size determination engine 133 monitors the TB size for the first set of subframes. Further, the TB size determination engine 133 predicts the average TB size for the second set of subframes based on the learning technique. Further, the frequency determination engine 131 determines the average frequency for operating the processor 110 for the predetermined time interval based on the predicted average TB size. Further, the operating frequency controller 130 operates the processor 110 with the determined average frequency for the predetermined time interval for processing the second set of subframes.

In an embodiment, the frequency determination engine 131 determines whether the average frequency meets the load required for the processor 110. Further, the operating frequency controller 130 dynamically vary the average frequency to meet the load in response to determining that the average frequency fails to meet the predicted load.

In another embodiment, the frequency determination engine 131 determines the average frequency for operating the processor 110 for the predetermined time interval using the deterministic technique. In the deterministic technique, the packet size determination engine 134 collects the plurality of packets for the plurality of subframes over the predetermined time interval, where the plurality of packets are stored in the memory 120. Further, the packet size determination engine 134 determines the average size of the plurality of packets collected from the plurality of subframes. Further, the frequency determination engine 131 determines the average frequency based on the determined average size. Furthermore, the operating frequency controller 130 operates the processor 110 with the determined average frequency for the predetermined time interval.

FIG. 5 is a flow diagram 500 illustrating various operations for operating the processor 110 of the electronic device 100 with the average frequency for the predetermined time interval, according to an embodiment as disclosed herein.

At 510, the method includes determining the average frequency for operating the processor 110 for the predetermined time interval. In an embodiment, the method allows the frequency determination engine 131 to determine the average frequency for operating the processor 110 for the predetermined time interval.

At 520, the method includes operating the processor 110 with the determined average frequency for the predetermined time interval. In an embodiment, the method allows the operating frequency controller 130 to operate the processor 110 with the determined average frequency for the predetermined time interval.

The various actions, acts, blocks, steps, or the like in the flow diagram 500 may be performed in the order presented, in a different order or simultaneously. Further, in some embodiments, some of the actions, acts, blocks, steps, or the like may be omitted, added, modified, skipped, or the like without departing from the scope of the invention.

FIG. 6 is a flow diagram 600 illustrating various operations for operating the processor 110 of the electronic device 100 with the average frequency for the predetermined time interval based on the learning technique, according to an embodiment as disclosed herein.

At 610, the method includes determining the average frequency for operating the processor 110 for the predetermined time interval. In an embodiment, the method allows the frequency determination engine 131 to determine the average frequency for operating the processor 110 for the predetermined time interval.

At 620, the method includes operating the processor 110 with the determined average frequency for the predetermined time interval. In an embodiment, the method allows the operating frequency controller 130 to operate the processor 110 with the determined average frequency for the predetermined time interval.

At 630, the method includes determining the average frequency meets the load required for the processor 110. In an embodiment, the method allows the frequency determination engine 131 to determine whether the average frequency meets the load on the processor 110.

If the determined average frequency meets the load on the processor 110 then, at 640, the method includes continuing to operate the processor 110 with the determined average frequency for the predetermined time interval. In an embodiment, the method allows the operate frequency controller 130 to continue to operate the processor 110 with the determined average frequency for the predetermined time interval.

If the determined average frequency does meets the load on the processor 110 then, at 650, the method includes dynamically varying the average frequency to meet the load. In an embodiment, the method allows the operate frequency controller 130 to dynamically vary the average frequency to meet the load.

The various actions, acts, blocks, steps, or the like in the flow diagram 600 may be performed in the order presented, in a different order or simultaneously. Further, in some embodiments, some of the actions, acts, blocks, steps, or the like may be omitted, added, modified, skipped, or the like without departing from the scope of the invention.

FIG. 7 is a flow diagram 700 illustrating various operations for determining the average frequency for the predetermined time interval based on the learning technique, according to an embodiment as disclosed herein.

At 710, the method includes monitoring the average TB size for the first set of subframes. In an embodiment, the method allows the TB size determination engine 133 to monitor the TB size for the first set of subframes. At 720, the method includes predicting the average TB size for the second set of subframes based on the learning technique. In an embodiment, the method allows the TB size determination engine 133 to predict the average TB size for the second set of subframes based on the learning technique.

At 730, the method includes determining the average frequency for operating the processor 110 for the predetermined time interval based on the predicted average TB size. In an embodiment, the method allows the frequency determination engine 131 to determine the average frequency for operating the processor 110 for the predetermined time interval based on the predicted average TB size.

At 740, the method includes operating the processor 110 with the determined average frequency for the predetermined time interval for processing the second set of subframes. In an embodiment, the method allows the operating frequency controller 130 to operate the processor 110 with the determined average frequency for the predetermined time interval for processing the second set of subframes.

The various actions, acts, blocks, steps, or the like in the flow diagram 700 may be performed in the order presented, in a different order or simultaneously. Further, in some embodiments, some of the actions, acts, blocks, steps, or the like may be omitted, added, modified, skipped, or the like without departing from the scope of the invention.

FIG. 8 is a flow diagram 800 illustrating various operations for determining the average frequency for the predetermined time interval based on a deterministic technique, according to an embodiment as disclosed herein. At 810, the method includes collecting the plurality of packets for the plurality of subframes over the predetermined time interval. In an embodiment, the method allows the memory 120 to collect the plurality of packets for the plurality of subframes over the predetermined time interval.

At 820, the method includes determining the average size of the plurality of packets collected from the plurality of subframes. In an embodiment, the method allows the TB size determination engine 133 to determine the average size of the plurality of packets collected from the plurality of subframes. At 830, the method includes determine the average frequency based on the determined average size. In an embodiment, the method allows the frequency determination engine 131 to determine the average frequency based on the determined average size.

The various actions, acts, blocks, steps, or the like in the flow diagram 800 may be performed in the order presented, in a different order or simultaneously. Further, in some embodiments, some of the actions, acts, blocks, steps, or the like may be omitted, added, modified, skipped, or the like without departing from the scope of the invention.

FIG. 9B are an example illustrations of operating the processor 110 of the electronic device 100 with the average frequency, according to an embodiment as disclosed herein. The operating frequency controller 110 is configured to operate/apply the average frequency for the predetermined time interval such as N frames. Let the N frames are next 100 frames will be received at the processor 110. As the average frequency i.e., the constant frequency is applied over N frames, the power consumption by the processor 110 is very less compared to the power consumption as shown in the FIG. 9A.

FIG. 10 is an example illustration of operating the processor 110 of the electronic device 100 with the average frequency for power saving, according to an embodiment as disclosed herein. Consider the processor 100 of the electronic device 100 is run $f_1$ at and $f_2$ frequencies for an equal proportions of time, where $f_1$ and $f_2$ represents the discrete frequency levels. The power consumption for the entire duration can be effectively defined as $P_{effective}$.

$$P_{effective} = \frac{P_1 + P_2}{2}$$

$$f_{effective} = \frac{f_1 + f_2}{2}$$

Equation 1

As shown in the FIG. 10, based on the parabolic nature of the curve, when applying the effective frequency (i.e., constant frequency) over the entire period, the processor 110 can run at lower power ($P_x$). Thus, the frequent switches across power levels are avoided and an increased power saving is achieved.

FIG. 11 is an example illustration of operating the processor 110 of the electronic device 100 with the average frequency, according to an embodiment as disclosed herein. Consider the processor 100 of the electronic device 100 is run frequency $f_i$ corresponding to power $P_i$) in the $i^{th}$ sub-frame over a period of N subframes. Consider when the frequency is switched at different times, the effective power will be Math FIG. 2.

$$P_{eff} = \frac{P_1 + P_2 + \ldots + P_n}{n}$$

$$f_{eff} = \frac{f_1 + f_2 + \ldots + f_n}{n}$$

Equation 1

As shown in the FIG. 11, based on the parabolic nature of the curve, the effective frequency (i.e., constant frequency) ($f_{eff}$) over that fixed time period saves the power by: $P_{eff}$-$P_x$. Further, $P_{eff}$ will always be above the parabolic curve.

FIG. 12 is an example illustration of operating the processor 110 of the electronic device 100 with the average frequency for power saving, according to an embodiment as disclosed herein. In conjunction with the FIG. 11, the parabolic curve is converted into the parabolic curve with a linear line between two discrete frequency levels as shown in the FIG. 12. The linear line such as a straight dotted line indicates that the average frequency ($f_{eff}$) falls between two discrete frequency levels such as $f_L$ and $f_H$. In an embodiment, the operating frequency controller 130 is configured to apply the higher frequency level ($f_H$) of the discrete frequency levels to meet the deadline such as received TB size.

FIG. 13 is an example illustration of a power level of a multi-core processor in the electronic device 100, according to an embodiment as disclosed herein. In an embodiment, when the average frequency falls between the two discrete frequency levels such as and $f_2$ (such as $f_2$), then the frequency $f_2$ is applied in order to meet deadlines. The relation between the power level and the applied frequency for Exynos 7420-A53 processor with multi-core processors is depicted in the FIG. 13.

FIG. 14 is an example illustration of an effective power of the electronic device 100 when the average frequency falls between two discrete frequency levels, according to an embodiment as disclosed herein. In conjunction with the FIG. 12, consider only discrete frequencies are available. Further, $f_{required,i}$ is the required frequency for $i^{th}$ sub-frame and $f_i$ is next immediate available frequency which is applied for that $i^{th}$ sub-frame. The $f_{required,i}$ is given by below Math FIG. 3:

$$f_{required,i} \leq f_i$$

Equation 3

In an embodiment, a minimum frequency required to process the total CPU load over n frames to meet the deadline is $f_{average}$ given by below Math FIG. 4:

$$f_{effective} = \frac{\sum_{i=1}^{n} f_i}{n}$$

Equation 4

In an embodiment, an average of frequencies applied in each sub frame over n frames $P_{effective}$ given by below Math FIG. 5:

$$f_{average} = \frac{\sum_{i=1}^{n} f_{required,i}}{n}$$

Equation 5

In an embodiment, operating frequency controller 130 configured to apply the average frequency for reducing power consumption. Based on the Math FIGS. 3, 4 and 5, if $f_{average} < f_{effective}$ then, the operating frequency controller 130 is configured to operate the processor 110 at the lower frequency to save power. The proposed method can be used to applying the average frequency to the processor 110 of the electronic device 100. If the $f_{average}$ falls between two discrete frequencies, the operating frequency controller 130 apply the frequency to meet the processing load as discussed in the FIGS. 15-20.

FIG. 15 is a flow diagram 1500 illustrating various operations for operating the processor 110 of the electronic device 100 with the average frequency, when the determined average frequency falls between two discrete frequency levels, according to an embodiment as disclosed herein.

At 1510, the method includes determining whether the determined average frequency falls between two discrete frequency levels. In an embodiment, the method allows the operating frequency controller 130 to determine whether the determined average frequency falls between two discrete frequency levels.

If the determined average frequency falls between two discrete frequency levels then, at 1520, the method includes operating the processor 110 of the electronic device 100 between the higher frequency level and the lower frequency level in proportions of a ratio of difference between the higher frequency level and the average frequency level to the difference between the average frequency level and the lower frequency level over the predetermined time interval. In an embodiment, the method allows the operating frequency controller 130 to operate the processor 110 between the higher frequency level and the lower frequency level in proportions of a ratio of difference between the higher frequency level and the average frequency level to the difference between the average frequency level and the lower frequency level over the predetermined time interval.

In an example, the operating frequency controller 130 applies the higher frequency level during a time duration of difference between the higher frequency level and the average frequency level over the predetermined time interval. Similarly, the operating frequency controller 130 applies the lower frequency level during the time duration of difference between the average frequency level and the lower frequency level over the predetermined time interval.

In an embodiment, the proportions of a ratio of difference between the higher frequency level and the average frequency level to the difference between the average frequency level and the lower frequency level over the predetermined time interval indicates the two timer instance in the predetermined time interval. Consider the average frequency falls between exactly a center of the two discrete frequency levels such as the higher frequency level and the lower frequency level. Then, the operating frequency controller 130 operates the processor 110 at the lower frequency level during the time interval ($T_1$) where the $T_1$ is the time interval between the lower frequency level and the average frequency level. Similarly, the operating frequency controller 130 operates the processor 110 at the higher frequency level during the time interval ($T_2$) where the $T_2$ is the time interval between the higher frequency level and the average frequency level.

If the determined average frequency does not falls between two discrete frequency levels then, at 1530, the method includes detecting whether the average frequency is less than the minimum frequency level of the discrete frequency levels. In an embodiment, the method allows the operating frequency controller 130 to detect whether the average frequency is less than the minimum frequency level of the discrete frequency levels.

Further, at 1540, the method includes operating the processor 110 of the electronic device 100 between the minimum frequency level and an idle frequency level in proportions of a difference between the minimum frequency level and the average frequency level over the predetermined time interval. In an embodiment, the method allows the operating frequency controller 130 to operate the processor 110 of the electronic device 100 between the minimum frequency level and an idle frequency level in proportions of a difference between the minimum frequency level and the average frequency level over the predetermined time interval.

The various actions, acts, blocks, steps, or the like in the flow diagram 1500 may be performed in the order presented, in a different order or simultaneously. Further, in some embodiments, some of the actions, acts, blocks, steps, or the like may be omitted, added, modified, skipped, or the like without departing from the scope of the invention.

FIG. 16 is an example illustration of the effective power of the processor 110 associated with the electronic device 100 when the average frequency falls between two discrete frequency levels, according to an embodiment as disclosed herein.

As shown in the FIG. 16, consider if $f_{average} < f_H$, then $f_{average}$ can be generated by switching between $f_H$ and $f_L$ in proportions of $(f_{average} - f_L):(f_H - f_{average})$ over the period for saving power. Here, the higher frequency level $f_H$ is $f_5$ lower frequency level $f_L$ is $f_4$. The amount of power saving is illustrated in the FIG. 16.

Further, if $f_{average} f_{min}$, then $f_{average}$ can be generated by switching between $f_{min}$ and idle in proportions of $(f_{average}):(f-f_{average})$ over the period for saving power. If $f_{average}$ is same as available frequency then, the operating frequency controller 130 can apply $f_{average}$ for entire time duration.

FIG. 17 is a flow diagram 1700 illustrating various operations for operating the processor 110 of the electronic device 100 with the average frequency, when the determined average frequency falls between two discrete frequency levels, according to an embodiment as disclosed herein.

At 1710, the method includes determining whether the determined average frequency falls between two discrete frequency levels. In an embodiment, the method allows the operating frequency controller 130 to determine whether the determined average frequency falls between two discrete frequency levels.

If the determined average frequency falls between two discrete frequency levels then, at 1720, the method includes operating the processor 110 between the higher frequency level and an idle frequency level in proportions of a difference between the higher frequency level and the average frequency level over the predetermined time interval. In an embodiment, the method allows the operating frequency controller 130 to operate the processor 110 between the higher frequency level and an idle frequency level in proportions of a difference between the higher frequency level and the average frequency level over the predetermined time interval.

If the determined average frequency does not falls between two discrete frequency levels then, at 1730, the method includes detecting whether the average frequency is less than the minimum frequency level of the discrete frequency levels. In an embodiment, the method allows the operating frequency controller 130 to detect whether the average frequency is less than the minimum frequency level of the discrete frequency levels.

Further, at 1740, the method includes operating the processor 110 of the electronic device 100 between the minimum frequency level and the idle frequency level in proportions of a difference between the minimum frequency level and the average frequency level over the predetermined time interval. In an embodiment, the method allows the operating frequency controller 130 to operate the processor 110 of the electronic device 100 between the minimum frequency level and the idle frequency level in proportions of the difference between the minimum frequency level and the average frequency level over the predetermined time interval.

The various actions, acts, blocks, steps, or the like in the flow diagram 1700 may be performed in the order presented, in a different order or simultaneously. Further, in some embodiments, some of the actions, acts, blocks, steps, or the like may be omitted, added, modified, skipped, or the like without departing from the scope of the invention.

FIG. 18 and FIG. 19 are example illustrations of the effective power of the processor 110 associated with the electronic device 100 when the average frequency falls between two discrete frequency levels, according to an embodiment as disclosed herein. In an embodiment, if $f_L < f_{average} < f_H$, then the average frequency is generated by switching between next immediate available frequency ($f_H$) and the idle frequency level in proportions of $f_{average}:(f_H - f_{average})$ over the period for saving power. Here, the higher frequency level $f_H$ is $f_2$ and lower frequency level is $f_L$ is $f_1$. As shown in the FIG. 18, the power and frequency curve displays more power saving is achieved using the effective power computed using operations specified in FIG. 17. As shown in the FIG. 19, the power and frequency curve displays more power saving is achieved using the effective power computed using operations specified in FIG. 15.

FIG. 20 is a flow diagram 2000 illustrating various operations for operating the processor 110 of the electronic device 100 with the average frequency, when the determined average frequency falls between two discrete frequency levels, according to an embodiment as disclosed herein.

At 2010, the method includes determining whether the determined average frequency falls between two discrete frequency levels. In an embodiment, the method allows the operating frequency controller 130 to determine whether the determined average frequency falls between two discrete frequency levels.

If the determined average frequency falls between two discrete frequency levels then, at 2020, the method includes determining whether a ratio between a power and a frequency associated with the higher frequency level is comparatively greater than the ratio between the power and the frequency associated with the lower frequency level. In an embodiment, the method allows the operating frequency controller 130 to determine whether a ratio between a power and a frequency associated with the higher frequency level is comparatively greater than the ratio between the power and the frequency associated with the lower frequency level. For example, if $f_L < f_{average} < f_H$, then the operating frequency controller 130 is configured to determine whether $P_H/F_H > P_L/F_L$.

If the ratio between the power and the frequency associated with the higher frequency level is comparatively greater than the ratio between the power and the frequency associated with the lower frequency level i.e., $P_H/F_H > P_L/F_L$. then at 2030, the method includes operating the processor 110 between the higher frequency level and the lower frequency level ($f_H$ and $f_L$) in proportions of the ratio of difference between the higher frequency level and the average frequency level to the difference between the average frequency level and the lower frequency level ($f_H - f_{avg} : f_{avg} - f_L$) over the predetermined time interval. In an embodiment, the method allows the operating frequency controller 130 to operate the processor 110 between the higher frequency level and the lower frequency level in proportions of the ratio of difference between the higher frequency level and the average frequency level to the difference between the average frequency level and the lower frequency level over the predetermined time interval.

If the ratio between the power and the frequency associated with the higher frequency level is not greater than the ratio between the power and the frequency associated with the lower frequency level i.e., $P_H/F_H < P_L/F_L$. then at 2040, the method includes operating the processor 110 of the electronic device 100 between the higher frequency level and an idle frequency level $f_H$ and $f_{idle}$ in proportions of a difference between the higher frequency level and the average frequency level ($f_H - f_{avg}$) over the predetermined time interval. In an embodiment, the method allows the operating frequency controller 130 to operate the processor 110 of the electronic device 100 between the higher frequency level and the idle frequency level in proportions of a difference between the higher frequency level and the average frequency level over the predetermined time interval.

If the determined average frequency does not falls between two discrete frequency levels then, at 2050, the method includes detecting whether the average frequency is less than the minimum frequency level of the discrete frequency levels i.e., $f_{average} < f_{min}$. In an embodiment, the method allows the frequency determination engine 131 to detect whether the average frequency is less than the minimum frequency level of the discrete frequency levels.

Further, at 2060, the method includes operating the processor 110 of the electronic device 100 between the minimum frequency level and the idle frequency level ($f_{min}$ and $f_{idle}$) in proportions of a difference between the minimum frequency level and the average frequency level ($f_{min} - f_{avg}$) over the predetermined timer interval. In an embodiment, the method allows the operating frequency controller 130 to operate the processor 110 of the electronic device 100 between the minimum frequency level and the idle frequency level in proportions of a difference between the minimum frequency level and the average frequency level over the predetermined timer interval.

The various actions, acts, blocks, steps, or the like in the flow diagram 2000 may be performed in the order presented, in a different order or simultaneously. Further, in some embodiments, some of the actions, acts, blocks, steps, or the like may be omitted, added, modified, skipped, or the like without departing from the scope of the invention.

FIG. 21 is an example illustration of received TB size at the processor 110 of the electronic device 100, according to an embodiment as disclosed herein. As shown in the FIG. 22, the electronic device 100 such as LTE 4G Modem captures a dataset for every 1 ms, where a sample of 100 ms is shown.

FIG. 22 is an example illustration of the power level while operating the processor 110 of the electronic device 100 at the average frequency, according to an embodiment as disclosed herein. Referring to the FIG. 22, the power level and the operating frequency of the Snapdragon and Exynos processor are comparatively illustrated.

The embodiments disclosed herein can be implemented through at least one software program running on at least one hardware device and performing network management functions to control the elements. The elements shown in the FIGS. 1 through 22 include blocks which can be at least one of a hardware device, or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for operating a processor in an electronic device, the method comprising:
   identifying an average throughput for a first set of subframes;
   predicting a load of the processor for a second set of subframes based on the identified average throughput;
   determining an operating frequency of the processor for the second set of subframes based on the predicted load;
   identifying whether the determined operating frequency has an operating frequency level between a first frequency level and a second frequency level, the first frequency level being higher than the second frequency level;
   in response to the determined operating frequency having the operating frequency level, adjusting the determined operating frequency based on a ratio of a difference between the first frequency level and the operating frequency level to a difference between the operating frequency level and the second frequency level; and
   controlling the processor to operate on the adjusted operating frequency for the second set of subframes.

2. The method of claim 1, wherein the identifying of the average throughput comprises:
   identifying an average transport block (TB) size for the first set of subframes based on a modulation coding scheme (MCS), a coding rate, and a number of resource blocks (RBs) allocated to the electronic device; and
   identifying the average throughput based on the identified average TB size.

3. The method of claim 2, wherein the predicting of the load of the processor comprises:
   predicting an average size of data packets to be received in the second set of subframes based on the identified average TB size; and
   predicting the load of the processor based on the predicted average size.

4. The method of claim 1, wherein the identifying of the average throughput comprises:

identifying an average size of data packets received in the first set of subframes; and identifying the average throughput based on the identified average size.

5. The method of claim 1, further comprising:

adjusting the determined operating frequency min response to the determined operating frequency failing to meet a required load for the second set of subframes.

6. The method of claim 1, further comprising:

in response to the operating frequency level being less than the second frequency level, the determined operating frequency is adjusted based on a difference between a minimum frequency level and the operating frequency level.

7. An electronic device, comprising:

a memory;

a processor; and a controller coupled with the memory and the processor, configured to:

identify an average throughput for a first set of subframes, predict a load of the processor for a second set of subframes based on the identified average throughput, determine an operating frequency of the processor for the second set of subframes based on the predicted load, identify whether the determined operating frequency has an operating frequency level between a first frequency level and a second frequency level, the first frequency level being higher than the second frequency level, in response to the determined operating frequency having the operating frequency level, adjust the determined operating frequency based on a ratio of a difference between the first frequency level and the operating frequency level to a difference between the operating frequency level and the second frequency level, and control the processor to operate on the adjusted operating frequency for the second set of subframes.

8. The electronic device of claim 7, wherein the controller is further configured to:

identify an average transport block (TB) size for the first set of subframes based on a modulation coding scheme (MCS), a coding rate, and a number of resource blocks (RBs) allocated to the electronic device, and identify the average throughput based on the identified average TB size.

9. The electronic device of claim 8, wherein the controller is further configured to:

predict an average size of data packets to be received in the second set of subframes based on the identified average TB size, and predict the load of the processor based on the predicted average size.

10. The electronic device of claim 7, wherein the controller is further configured to:

identify an average size of data packets received in the first set of subframes, and identify the average throughput based on the determined identified average size.

11. The electronic device of claim 7, wherein the controller is further configured to:

adjust the determined operating frequency in response to the determined operating frequency failing to meet a required load for the second set of subframes.

12. The electronic device of claim 7, wherein, in response to the operating frequency level being less than the second frequency level, the determined operating frequency is adjusted based on a difference between a minimum frequency level and the operating frequency level.

\* \* \* \* \*